R. G. WILSON.
MINE TROLLEY.
APPLICATION FILED JAN. 21, 1920.
1,366,142.
Patented Jan. 18, 1921.
2 SHEETS—SHEET 1.
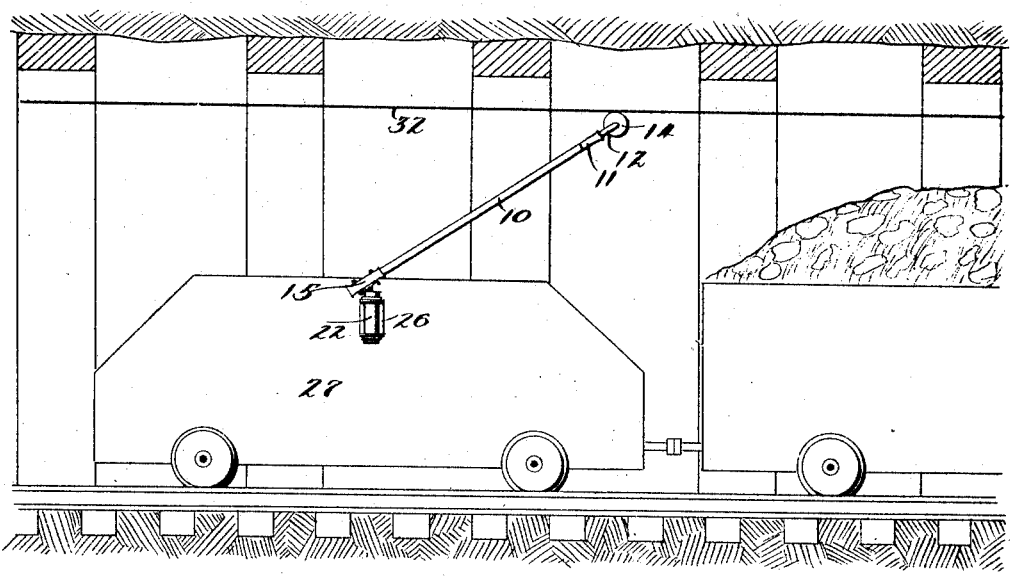
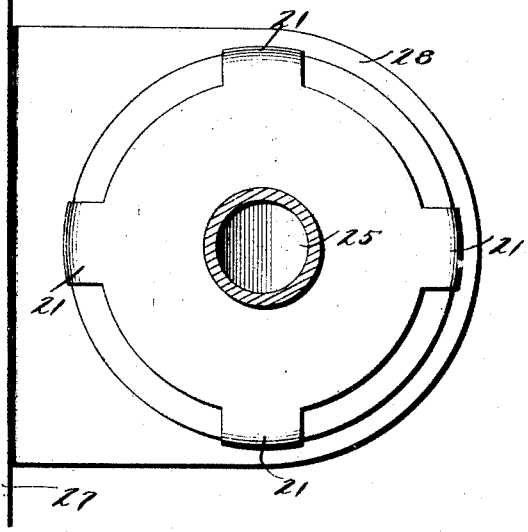
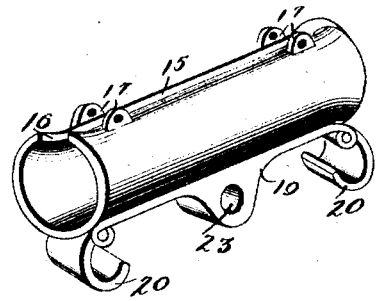
WITNESSES
INVENTOR
R. G. Wilson,
BY
ATTORNEYS

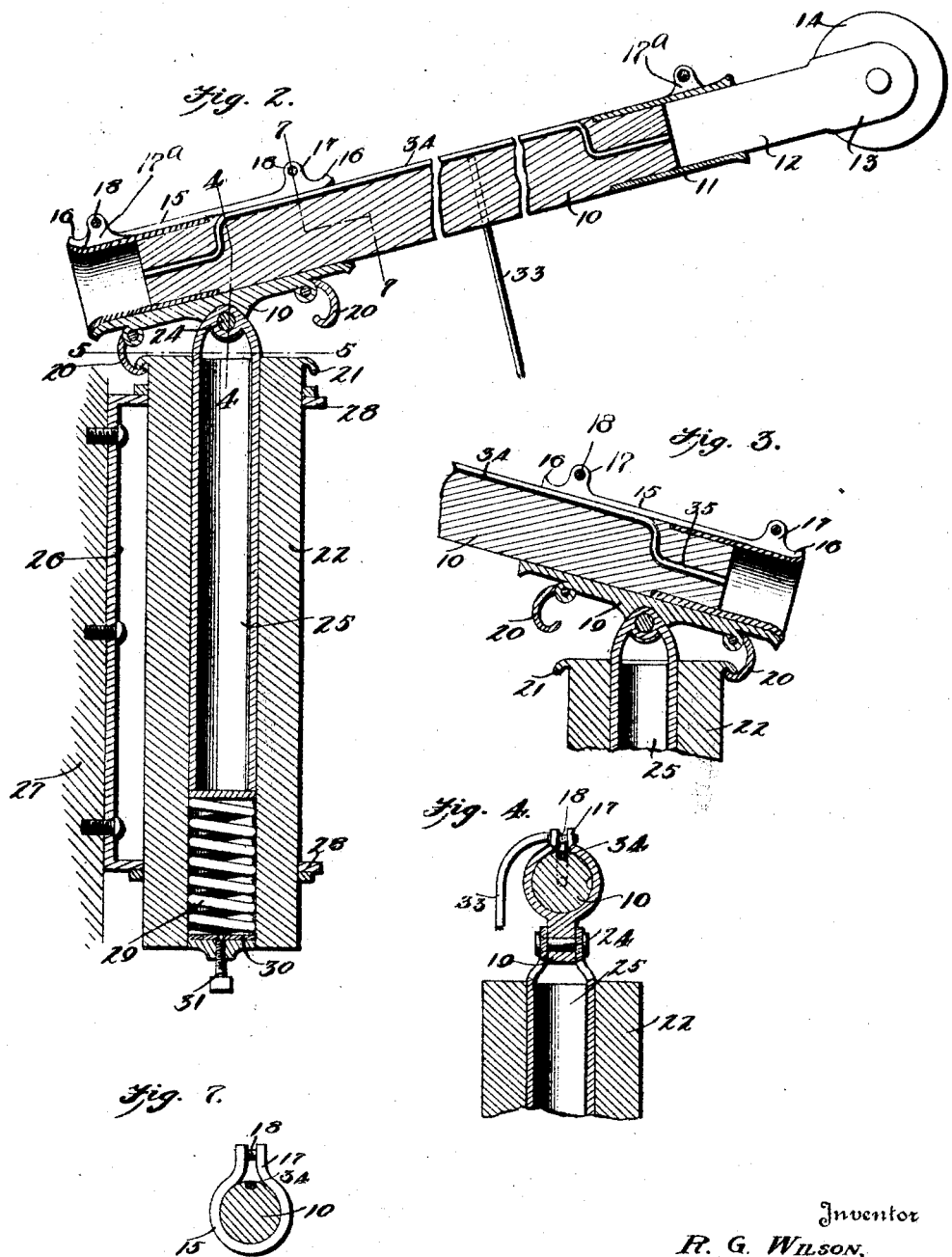

UNITED STATES PATENT OFFICE.

ROBERT GRANT WILSON, OF DAVIS, WEST VIRGINIA.

MINE-TROLLEY.

1,366,142.  Specification of Letters Patent.  Patented Jan. 18, 1921.

Application filed January 21, 1920. Serial No. 352,957.

*To all whom it may concern:*

Be it known that I, ROBERT G. WILSON, a citizen of the United States, and a resident of Davis, in the county of Tucker and State of West Virginia, have invented certain new and useful Improvements in Mine-Trolleys, of which the following is a specification.

My present invention relates generally to trolley poles and supports, and more particularly to mine trolleys, my object being the provision of a simple and durable arrangement capable of adjustments and movements for which the ordinary structure of this nature is not adapted.

More particularly my invention aims to provide a readily reversible pole by longitudinally sliding the same, and which need not be rotated for this purpose, and which is capable of ready release adjustment and resetting with minimum loss of time.

With these general statements in mind, my invention will be better understood by reference to the accompanying drawings, which form a part of this specification, and in which, Figure 1 is a side view illustrating the practical application of my invention, Fig. 2 is a vertical longitudinal section, Fig. 3 is a partial longitudinal section with the pole reversed with respect to Fig. 2, Fig. 4 is a vertical cross section taken substantially on line 4—4 of Fig. 2, Fig. 5 is a horizontal section taken substantially on line 5—5 of Fig. 2, Fig. 6 is a detail perspective view of the pole clasping member, and Fig. 7 is a detail vertical section taken on line 7—7 of Fig. 2.

Referring now to these figures my invention proposes an apparatus including preferably a cylindrical trolley pole 10, the opposite ends of which are provided as at 11 with extending end sockets, either of which is adapted to receive therein the cylindrical portion 12 of a trolley harp of any suitable construction as to its fork 13 which supports the trolley wheel 14.

This pole 10 is extended through a hollow lengthwise split cylindrical clamp or clasping member 15 having flared opposite ends 16, so that the pole 10 while shiftable lengthwise through the member 15, is prevented from pulling entirely therethrough by virtue of the flared portions 16 and sockets 11.

This clasping member has upstanding ears 17 at opposite sides of its split portion so that it may be clamped to securely hold the trolley pole, by clamping bolts 18.

Formed in connection with the clasping member 15 is a transversely apertured and centrally located hinge extension 19 having at its opposite ends downwardly and inwardly curved clasping or holding members 20 pivotally mounted and adapted for coöperation with the upper outwardly and downwardly turned flanges 21 of the supporting upright or stem 22. The transverse aperture 23 of the hinge extension 19 receives a transverse pivot pin 24 which extends also through the upper split bearing portion of a plunger 25 depending into and rotatable within the central bore of the stem 22.

The plunger 25 works vertically in the supporting stem 22 and forms therewith a vertically movable and rotatable trolley pole support, in connection with a bracket 26 secured to one side of an electric locomotive 27. The bracket 26 has upper and lower apertured flanges 28 through the apertures of which the stem 22 is seated. The lower closed end of the plunger 25 rests upon a spring 29 in turn resting on a plate 30 engaged by the inner end of an adjusting screw 31 working through the lower closed end 32 of the stem 22 and by means of which the tension of the spring may be increased when it becomes desirable or necessary to do so.

It is thus obvious that with the pole 10 clamped at either end within the tubular clasping member 15 and the latter in turn shifted to engage one of its holding members 20 of the hinge extension 19 with the upper flanges 21 of stem 22, a pivot will thus be formed upon which the roller carrying end of the pole will be elevated by the tension of the spring 29 pressing upwardly against the plunger 25.

It is also obvious that by virtue of the construction described it becomes a simple operation to lower the trolley pole until both holding members 20 are engaged with the upper flanges of the stem so as to hold the trolley pole in approximately horizontal position while its clamping bolts or pins 18 are removed and the pole 10 shifted lengthwise and its opposite end engaged in the clasping member 15. Then, by replacing the clasping bolts or pins 18, the operation can thus be carried out, when it is desired to reverse the trolley pole, in a space where there is insufficient room to rotate the same between the positions.

It is a well known fact that difficulties of this nature are often encountered in mines and, in the absence of my improvements and with the usual trolley arrangement it is necessary to reverse the locomotive with the trolley wheel preceding the same. Under these circumstances and with the usual construction the trolley wheel frequently jumps off the trolley wire indicated at 32 in Fig. 1, and thus the ordinary construction gives rise to important disadvantages which my invention avoids.

After the trolley pole has been shifted longitudinally through the clasping member 15 and its opposite end clamped in position for reversal purposes, the previously engaged holding member 20 is disengaged from the flanges 21 of the stem 22 and the opposite one engaged in order that the spring 29 may again act through the plunger 25 to shift the free end of the trolley pole upwardly as may be plainly seen by a comparison of Figs. 2 and 3.

It is obvious that when the pole 10 is reversed, the harp with its trolley wheel is removed from one end socket 11 of the pole and placed into the opposite end socket, so that the matter of reversal of the pole can be readily accomplished with my improvements in places where, with the ordinary arrangement, it is impossible to swing the free end of the pole around to reversed position.

To provide for the locomotive feed wire 33, I attach its upper end to the center of a wire 34 extending along the pole 10 for the major portion of its length in a surface groove as seen in Figs. 2, 3 and 4, with its opposite ends 35 extending inwardly through openings in the pole and terminating at the inner central portions of the socket members 11 so as to receive the trolley harp thereagainst. By virtue of these connections it is obvious that the connected end of the feed wire 33 can pass between the split portions of the clamp 15 when reversing the pole.

Each end socket 11 preferably has an extending ear 17ª movable through the slot of the clamping member and shiftable into registry with certain of its ears 17 so as to receive therethrough the corresponding bolt 18 in order to prevent accidental endwise shifting of the pole.

I claim:

1. A trolley apparatus comprising the combination with a support including a vertically movable spring actuated member, a pole clasping member pivoted to the said spring actuated member of the support and having means for detachably engaging the support at opposite sides of the pivot, and a trolley pole provided with a socket at each end, and a harp and wheel detachably connected thereto and reversible from one end to the other, said pole and sockets slidably mounted in the said clasping member and being engageable at its opposite ends by the clasping member as and for the purpose described.

2. A trolley apparatus including a support having a spring actuated vertically movable member, a trolley pole, and a tubular pole clasping member in which the pole is mounted and adapted to be lengthwise shiftable, said pole clasping member having a pivotal connection with the vertically movable member of the support and having means to detachably engage the support at relatively opposite sides of the pivot as described.

3. A trolley arrangement comprising a support including a stem having a flanged upper end, a vertically shiftable plunger in the stem, a spring beneath the plunger, a tubular pole clasping member pivotally connected intermediate its ends to the said plunger and having depending holding members at relatively opposite sides of its pivot for engagement with the upper flanged edge of the stem, a trolley pole mounted in said clasping member and longitudinally shiftable in said clasping member, sockets at each end of the pole, and a trolley harp having a trolley wheel and shiftable into both of the end sockets of the pole, as and for the purpose described.

4. A trolley arrangement comprising a support including a stem having a flanged upper end, a vertically shiftable plunger in the stem, a spring beneath the plunger, a tubular pole clasping member pivotally connected intermediate its ends to the said plunger and having depending holding members at relatively opposite sides of its pivot for engagement with the upper flanged edge of the stem, a trolley pole mounted to slide longitudinally in said clasping member and sockets at the ends of said pole, and a trolley harp having a trolley wheel and shiftable into both of the end sockets of the pole, said spring of plunger being arranged in the lower portion of the stem, and an adjusting screw threaded through the lower end of the stem, having means to engage the spring and adjust the tension thereof as described.

5. A trolley arrangement comprising a support having a vertically movable spring actuated member, a split tubular clasping member pivotally mounted intermediate its ends upon the said vertically movable member of the support and having depending arms engageable with the support at relatively opposite sides of the pivot, a cylindrical trolley pole slidably mounted in said clasping member and engageable at either end thereby, and a harp having a trolley wheel and detachably engageable with the trolley pole at each of its ends.

6. A trolley arrangement comprising a support having a vertically movable spring actuated member, a split tubular clasping member pivotally mounted intermediate its ends upon the said vertically movable member of the support and having depending arms engageable with the support at relatively opposite sides of the pivot, a trolley pole slidably mounted in said clasping member and engageable at either end thereby, and a harp having a trolley wheel and detachably engageable with the trolley pole at each of its ends, said ends of said trolley pole and the said clasping member being flared for the purpose described.

7. A trolley arrangement comprising a support having a vertically movable spring actuated member, a split tubular clasping member pivotally mounted intermediate its ends upon the said vertically movable member of the support and having depending arms engageable with the support at relatively opposite sides of the pivot, a trolley pole mounted to slide longitudinally in said clasping member and engageable at either end thereby, and a harp having a trolley wheel and detachably engageable with the trolley pole at each of its ends, said pole having a lengthwise groove, a wire extending within the groove and having its end terminating in the end of the pole, and a feed wire connected to said first named wire intermediate the ends of the latter.

ROBERT GRANT WILSON.